Sept. 18, 1934.  R. LANG  1,973,817
COOKING UTENSIL
Filed March 25, 1933
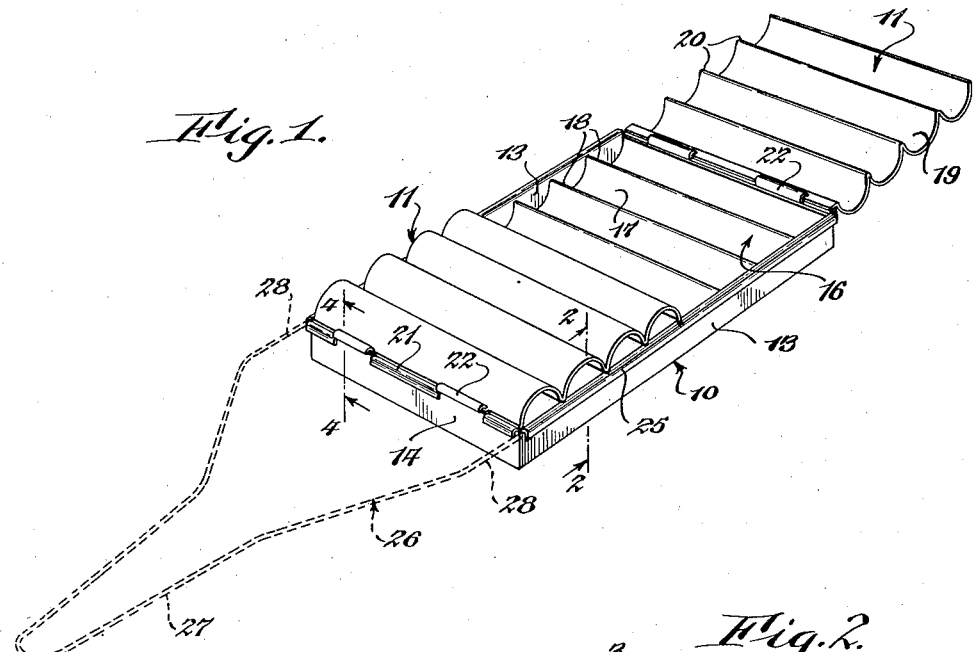
Fig. 1.
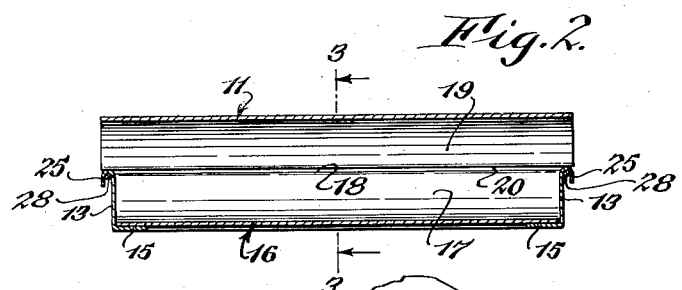
Fig. 2.
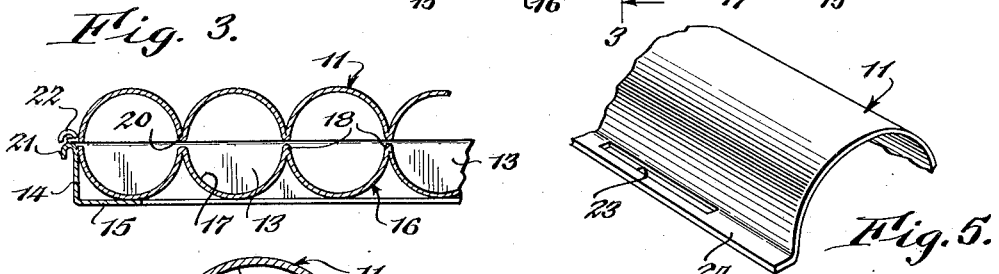
Fig. 3.
Fig. 5.
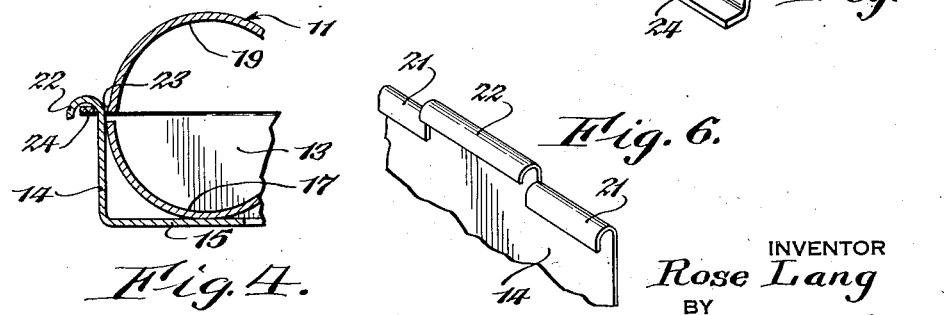
Fig. 6.
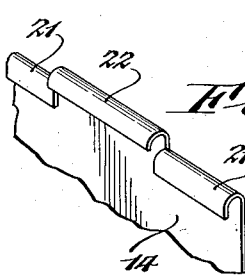
Fig. 4.
INVENTOR
Rose Lang
BY
Popp and Powers
ATTORNEYS Patented Sept. 18, 1934

1,973,817

UNITED STATES PATENT OFFICE 1,973,817

COOKING UTENSIL

Rose Lang, Buffalo, N. Y.

Application March 25, 1933, Serial No. 662,739

7 Claims. (Cl. 53—6)

This invention relates to cooking utensils of the kind which are especially designed for the cooking of elongated food products, for example, sausages of the frankfurter type, finger rolls, bread sticks, et cetera. More particularly the invention is concerned with improvements in utensils of the type generally described which include companion sections which co-operate to provide a series of individual compartments, the latter substantially conforming in shape to that of the food product.

One object of the invention is to provide a utensil which is available for the cooking of various kinds of food products.

A further object is to provide a utensil of the character generally described wherein the sections are so formed that they may, if desired, be separated and employed independently.

A still further object is for facility in handling of the utensil.

A still further object is to provide a utensil which is economical from a manufacturing standpoint.

The invention is illustrated in the accompanying drawing, in which:—

Figure 1 is a perspective view of a cooking utensil embodying features of the invention.

Figure 2 is a vertical section taken along line 2—2 of Fig. 1.

Figure 3 is a vertical section taken along line 3—3 of Fig. 2.

Figure 4 is an enlarged fragmentary section taken along line 4—4 of Fig. 1.

Figure 5 is an enlarged fragmentary perspective of a hinge providing portion of the cover section of the utensil.

Figure 6 is a similar view of the co-operating portion of the body section of the utensil.

The utensil, as illustrated, includes a body 10 and a pair of companion cover sections 11. The body is provided with vertical side walls 13 and vertical end walls 14, the said walls cooperating to provide a rectangular frame. The bottoms of the walls 13 and 14 are turned inwardly to provide flanges 15. The bottom of the body 10 is provided by a section 16 which is arranged between the walls 13 and 14 upon the flanges 15, the said section being formed to provide a series of transverse semi-circular channels 17 which are delimited by intervening ridges 18. The section 16 is preferably secured in the body 13 and the joints between the side margins of the section and the co-operating side walls 13 may, if desired, be sealed in any suitable manner.

The cover sections 11 are, as illustrated, similarly constructed. Each of the sections is formed with transverse semi-circular channels 19 which are delimited by intervening ridges 20, the channels and ribs of the cover sections being in opposed relation with respect to the corresponding parts of the bottom section 16. The compartments or chambers which are thus provided are independent and, as illustrated, are of a substantially circular cross-section. The end walls 14 of the body 10 are formed at their upper margins with hook-shaped flanges 21 and 22, the former serving as a reinforcement for the said walls. The flanges 22 (Figure 4) pass through slots 23 which are formed in end extensions 24 of the section. They permit the sections to be opened to provide access to the interior of the utensil, it being noted that the relation between the flanges 22 and openings 23 is such that, if desired, the cover sections may be entirely removed. The upper margins of the side walls of the body 10 are turned outwardly and downwardly to provide flanges 25. The latter serve to reinforce the side walls of the body and provide a rest for the ridges 20 of the cover sections when the latter are closed.

In the use of the utensil, for example in the cooking of sausages of the frankfurter type, a sausage is arranged in each of the channels of the body section 16 and the cover sections are then closed. Owing to the conforming fit of the walls of the utensil the sausages are cooked uniformly and rapidly. The side walls 13 of the body close the ends of the channels of the section 16 to prevent the escape of grease or food juices while the open ends of the channels of the cover sections permit the escape of steam. This is particularly desirable when the utensil is used for baking various articles of a bread-like character, as in such cases it is necessary that a large part of the contained moisture be expelled.

A handle 26 is preferably employed in connection with the receptacle to facilitate handling thereof. The said handle includes a portion 27 which may be grasped by the user and is formed or provided with elongated arms 28. The latter are adapted to fit alongside the sides 13 of the body in the grooves provided by the flanges 25, the handle preferably being so formed that it may be applied or removed at will.

From the foregoing it will be apparent that the utensil described is available for the cooking of a wide variety of food products, the cover sections thereof being readily removable as occasion demands. The formation of the utensil in the manner described has the advantage that it may be manufactured entirely from sheet or tin plate. An economical construction is, therefore, provided. In the use of the utensil it may, if desired, be employed as an open cooking receptacle, for example, for the cooking of the layers of a cake. In such a case the cover sections may be readily removed by opening them to such an extent as to permit withdrawal of the hook-shaped flanges 22 from the slots 23.

I claim as my invention:

1. A cooking utensil including a body section formed to provide a series of elongated channels which are closed at their ends and a co-operating cover section which is formed to provide a series of similar channels, the channels of said cover section being open at their ends and being adapted to co-operate with the channels of said body section to provide a series of independent compartments.

2. A cooking utensil including a body section formed to provide a series of elongated channels which are substantially semi-circular in cross-section and which are closed at their ends and a co-operating cover section which is formed to provide a series of channels of similar cross-section which are open at their ends, the channels of said sections co-operating to provide a series of independent compartments of substantially circular cross-section.

3. A cooking utensil including a body section formed to provide a series of elongated channels which are substantially semi-circular in cross-section and which are closed at their ends and a pair of companion cover sections formed with channels of a similar cross-section, the said companion cover sections being pivotally connected to the opposite ends of said body section so that they may be opened independently of one another, said cover sections co-operating with said body section to provide a continuous series of independent compartments of substantially circular cross-section.

4. A cooking utensil including a body which is formed with vertical side and end walls, the lower marginal edges of said walls being provided with inwardly extending flanges, a bottom section arranged between said walls upon said flanges, said section being formed to provide a series of elongated channels which are closed at their ends by said side walls and a co-operating cover section which is formed to provide a series of similar channels, the channels of said cover section and said bottom section co-operating to provide a series of independent compartments.

5. A cooking utensil including a body which is formed with vertical side and end walls, the lower marginal edge of said walls being provided with inwardly extending flanges, a bottom section arranged between said walls upon said flanges, said bottom section being formed to provide a series of elongated channels which are of substantially semi-circular cross-section and which are closed at their ends by said side walls and a co-operating cover section which is formed to provide a series of channels of similar cross-section, the channels of said cover section being open at their ends and co-operating with the channels of said bottom section to provide a series of independent compartments of substantially circular cross-section.

6. A cooking utensil including a body which is formed with vertical side and end walls, the lower marginal edge of said walls being inturned to provide flanges, a bottom section arranged between said walls upon said flanges, said bottom section being formed to provide a series of channels which are closed at their ends by said side walls and a pair of companion cover sections formed with channels of similar cross-section, said companion cover sections being pivotally connected to the end walls of said body and co-operating with said bottom section to provide a series of independent compartments.

7. The combination with a cooking utensil having a body which is formed with vertical side and end walls, the lower marginal edges of said walls being inturned to provide flanges and the upper marginal edges of said side walls being bent outwardly and downwardly to provide grooves, a bottom section arranged between said walls upon said flanges, said bottom section being formed to provide a series of channels which are closed at their ends by the said side walls and a cover section which is pivotally connected to the end walls of said body and which is formed to provide a series of channels of a cross-section similar to that of the channels formed in said bottom section, the channels of said bottom and cover sections co-operating to provide a series of independent compartments, of a handle for the said utensil, said handle having arms which are adapted to be inserted in said grooves.

ROSE LANG.